(No Model.)

C. H. WESTON.
SAW KNOCKDOWN DEVICE.

No. 423,503. Patented Mar. 18, 1890.

Witnesses
Edward Lees
Edward D. Keyes

Inventor
Clinton H. Weston.
By W. A. Finkelnburg,
Attorney.

UNITED STATES PATENT OFFICE.

CLINTON H. WESTON, OF LA CROSSE, WISCONSIN.

SAW-KNOCKDOWN DEVICE.

SPECIFICATION forming part of Letters Patent No. 423,503, dated March 18, 1890.

Application filed November 30, 1888. Serial No. 292,436. (No model.)

*To all whom it may concern:*

Be it known that I, CLINTON H. WESTON, a citizen of the United States, residing at La Crosse, in the county of La Crosse and State of Wisconsin, have invented a new and useful Saw-Knockdown Device; and I do declare the following to be a full, clear, and exact description of the invention, such as will enable others skilled in the art to which it appertains to make and use the same.

My invention has relation to a saw-knockdown device; and the object of my invention is to bend over or knock down the points of saw-teeth on band and gang saws evenly and uniformly without the aid of a hammer. This object I accomplish by the means shown and illustrated in the accompanying drawings, in which—

Figure 1:
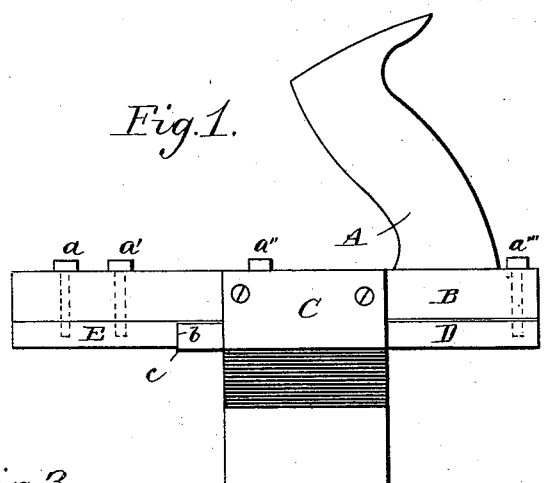
Figure 2:
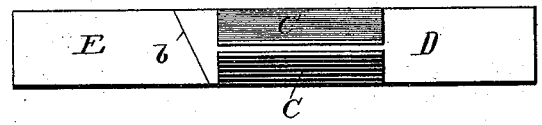
Figures 5, 6:
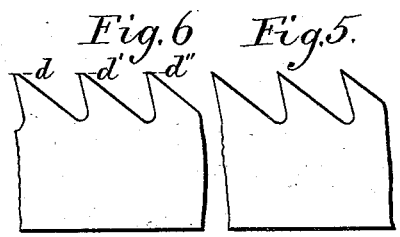

Figure 1 is a side elevation of the device. Fig. 2 is a bottom plan view, and Fig. 3 an end view of the same. Fig. 4 is a side elevation of the device and a portion of a saw-blade showing the position of the device when applied to a saw for the purpose above stated. Fig. 5 is a detail of a portion of a band or gang saw before the points of the teeth have been "knocked down," and Fig. 6 is a view of such saw after the hammer or my invention has been applied.

Referring by letter to said drawings, A indicates the handle, which may be of any ordinary or approved pattern.

B indicates the body of the device, which should be made from iron or other heavy material to give it sufficient weight.

Figure 3:
Figure 4:
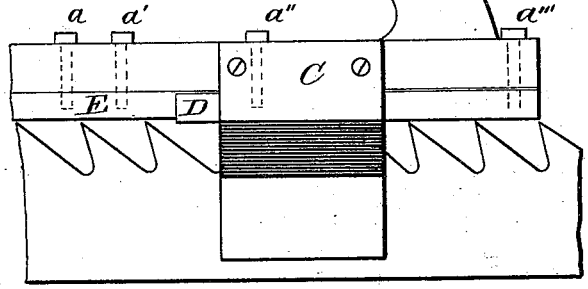

C and C indicate guides fastened to the sides of B by the aid of bolts or other suitable means bent to such a shape that when attached there will be a space between the lower parts of C and C equal to the thickness of a saw-blade, as is fully shown in Fig. 3.

D and E indicate steel plates or dies secured to B by bolts $a$ $a'$ $a''$ $a'''$ or other suitable means. The ends of the plates D and E, where they meet at $b$, have an angle of about twenty-five degrees from a line drawn at right angles to the length of the plate, as is fully shown in Fig. 2. When in position for use, the face of plate D projects below the face of plate E. This projection is obtained by placing between D and B layers of paper or other suitable material of the required thickness, and the bolts $a''$ and $a'''$ are tightened until the plate D is held firmly in place.

In Fig. 6, $d$ indicates the knockdown part of saw-teeth—that is, the points are bent over or knocked down so that they are on a line with the plane of the teeth. This method of setting the points of gang and band saw teeth is old and has heretofore been accomplished with a hammer, it being necessary to strike each tooth separately and with the greatest care, and it being impossible to keep the points in perfect alignment. The distance that D projects below E equals the distance of the tooth-point to be set down.

The bend of the plate is rounded at its face, as shown at $c$, so that the projection is not an abrupt or angular one, but one which will first engage the extreme point of the tooth and then follow the tooth downward until the distance of the projection is reached.

When my device is employed, the saw-blade is placed between the guides C C, with the teeth resting against the plates D and E at the bottom of my device, as shown in Fig. 4. By then moving said device forward the plate E moves over the teeth without disturbing the points; but the plate D, at $b$, projecting below E and forming a rounded set-off, strikes the point and bends it over or "knocks it down," as required.

Having described my invention, what I claim is—

1. A saw-knockdown device consisting of a handle A, a body B, metal plates or dies D and E, and guides C C, attached to B, all substantially as described.

2. A saw-knockdown device consisting of a handle A, a body B, guides C C, a metal plate or die E, having one end on a slant of about twenty-five degrees, and an adjustable metal plate or die D, having one end on a slant of about twenty-five degrees, substantially as described.

3. A saw-knockdown device consisting of a handle A, a body B, guides C C, a metal plate E, attached to B, and an adjustable metal plate D, attached to B, with its face projecting below that of E, having its line of projection rounded, for the purpose stated, all substantially as described.

In testimony whereof I affix my signature in presence of two witnesses.

CLINTON H. WESTON.

Witnesses:
PAUL W. MAHONEY,
E. P. WALCOTT.